(12) United States Patent
Han (10) Patent No.: US 7,527,574 B2
(45) Date of Patent: May 5, 2009

(54) TRANSMISSION HAVING SIMPLE CONSTRUCTION

(75) Inventor: Seung-Woo Han, Incheon (KR)

(73) Assignee: Wooyoung Hydraulics Co., Ltd., Incheon (KR)

(*) Notice: Subject to any disclaimer, the term of this patent is extended or adjusted under 35 U.S.C. 154(b) by 0 days.

(21) Appl. No.: 11/038,013

(22) Filed: Jan. 18, 2005

(65) Prior Publication Data

US 2005/0266951 A1 Dec. 1, 2005

(30) Foreign Application Priority Data

Jan. 15, 2004 (KR) .................... 10-2004-0002909

(51) Int. Cl.
*F16H 37/08* (2006.01)
(52) U.S. Cl. ...................................... 475/198
(58) Field of Classification Search .............. 475/198, 475/201, 203, 205, 206, 225, 311, 900; 180/372
See application file for complete search history.

(56) References Cited

U.S. PATENT DOCUMENTS 3,412,631 A * 11/1968 Frost ........................... 475/205
5,088,967 A * 2/1992 Opitz et al. ................. 475/107

FOREIGN PATENT DOCUMENTS

| JP | 59-199328 | 11/1984 |
| JP | 1-82342 | 6/1989 |
| JP | 04-90931 | 3/1992 |
| JP | 7-332483 | 12/1995 |
| JP | 08-002267 | 1/1996 |
| JP | 2003-343622 | 3/2003 |
| KR | 10-2002-0013364 | 2/2002 |
| KR | 10-2003-0022621 | 3/2003 |
| WO | WO 3022615 A1 * | 3/2003 |

* cited by examiner

*Primary Examiner*—Charles A Marmor
*Assistant Examiner*—Derek D Knight
(74) *Attorney, Agent, or Firm*—Mayer & Williams PC; Stuart H. Mayer, Esq.; Karin L. Williams, Esq.

(57) ABSTRACT

A transmission for a vehicle. A rotation force generated in an engine is transmitted via a torque converter to an output shaft. Power of the output shaft is transmitted at a right angle at a bevel gear section that includes a bevel pinion gear and a bevel ring gear. The bevel ring gear transmits power to a clutch unit that includes forward and backward clutch sections to be connected to the bevel ring gear when speed-change operation is implemented (for example, forward/backward gear shift operations). The clutch unit is connected to a differential gear case, which transmits power to a differential pinion gear and a drive shaft. The vehicle drivable through a reduction gear assembly that is mountable to an axle assembly.

8 Claims, 9 Drawing Sheets

TRANSMISSION HAVING SIMPLE CONSTRUCTION

FIELD OF THE INVENTION

Aspects of the present invention relate to a transmission in which a clutch unit is separated from a wheel reduction gear assembly and positioned between a bevel gear and a differential pinion gear, which may be applied to all powered vehicles, and more particularly to equipment such as forklifts, excavators, tractors, and other special vehicles.

As is well known to those skilled in the art, heavy equipment uses a hydraulic motor or an engine as its power source, and is divided into a wheel type and a crawler type, depending upon a shape of a wheel.

Unlike conventional vehicles, heavy equipment generally need not travel at high speeds or frequently change speeds. However, heavy equipment may have other problems to be solved, such as generation of noise and vibration, increase in the number of parts, and high manufacturing costs.

Describing a construction of a power transmission system which is applied to a conventional forklift, a transmission is located at a middle portion of the power transmission system, and a clutch is installed between an input shaft and an output shaft of the transmission to prevent or allow transmission of rotational force of the input shaft to the output shaft. However, since the transmission for heavy equipment is installed along with the clutch between a torque converter and an axle shaft, lengths of an engine and a drive shaft are increased, and significant noise and vibration generated in the engine is transferred via the transmission to a driver's seat, which is typically centrally positioned in the heavy equipment. Also, due to the fact that the conventional transmission is placed before a bevel gear which functions to change a power transmitting direction and implement gear reduction, shock generated in the transmission upon speed change is likely to be excessively transmitted to the driver's seat, and durability of the transmission may be decreased.

To at least partially cope with these problems, the present applicant disclosed a wheel transmission for heavy equipment in Korean Patent Application Nos. 2001-11280 and 2001-56004. In these documents, a transmission which uses a hydraulic clutch is mounted to a wheel axle assembly for front or rear wheels, and is connected to an axle via a propeller shaft, to prevent noise and vibration generated in the engine from being transferred to the transmission, to allow both wheels to be driven independently from each other, and to minimize a rotation radius when the heavy equipment is spun or turned. Also, due to the fact that a brake and the clutch are integrally formed with each other, it is possible to improve braking performance and render a compact structure. As a consequence, a variety of mounting options for the engine and axle may be designed.

Figure 1:
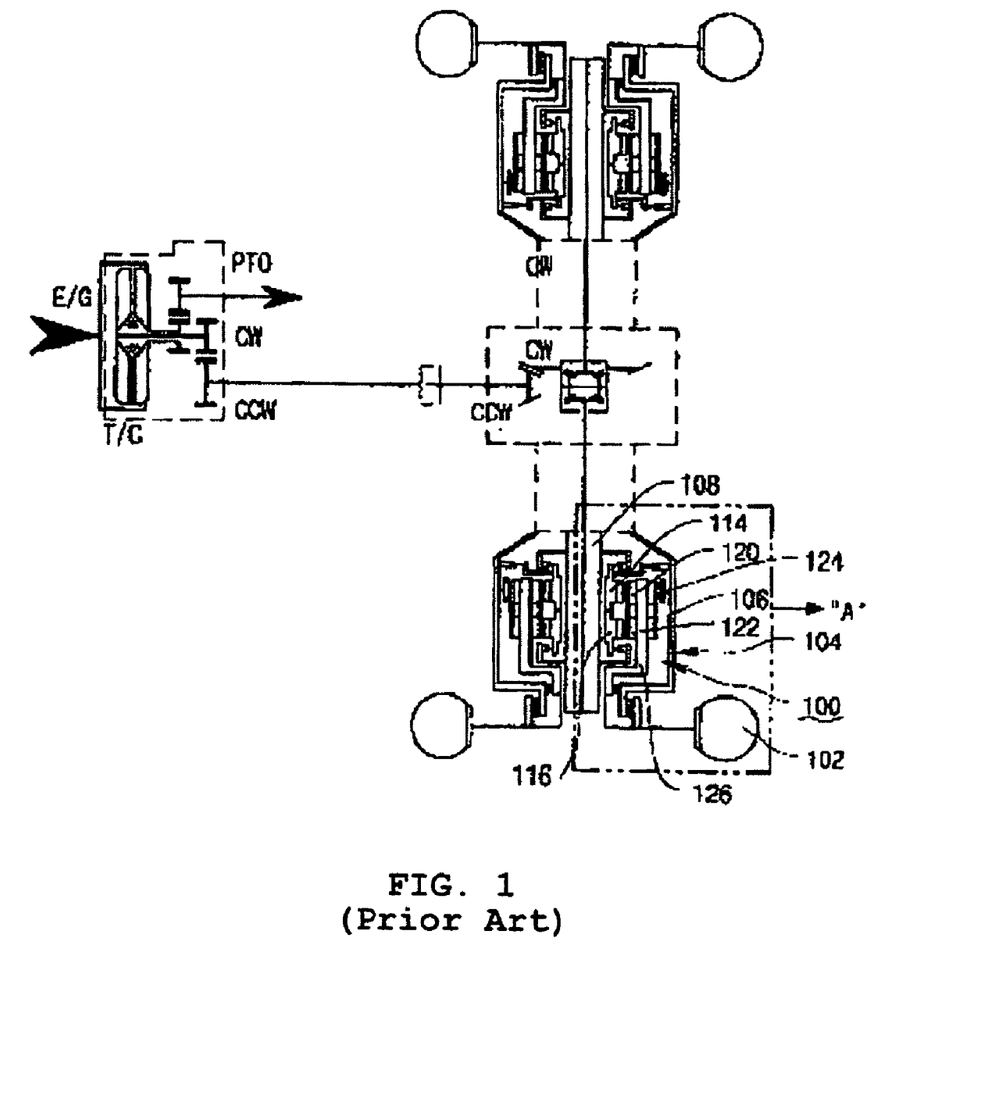
FIG. 1 is a schematic diagram illustrating a construction of a conventional wheel transmission.

With reference to FIG. 1, describing in more detail Korean Patent Application No. 2001-11280, a rotation force is transmitted to an axle shaft 108 via an engine, a torque converter, a propeller shaft, a bevel gear and a differential gear. A wheel transmission 100, which comprises a planetary gear assembly, a first transmission clutch section and a second transmission clutch section, is installed in an axle hub 104 in which both ends of the axle shaft 108 are positioned, to allow a pair of left and right wheels 102 to be independently driven.

It is desirable to use the above-described wheel transmission in a lightweight forklift, which generally does not need to be spun or turned—as such, there is a need for a main transmission capable of sharing parts with the wheel transmission, which is constructed with fewer parts, and which costs less to manufacture than a conventional transmission.

SUMMARY OF THE INVENTION

According to an aspect of the present invention, a transmission for a vehicle is provided. The vehicle has an engine, and the engine operative to generate a rotation force to an output shaft via a torque converter. The transmission includes: a bevel gear section arranged to receive power from the engine at a right angle to the output shaft, the bevel gear section having a bevel pinion gear and a bevel ring gear; a clutch unit arranged to receive power from the bevel ring gear in response to a speed-change operation, that is, a forward/backward gear shift operation, the clutch unit having a forward clutch section arranged for connection to the bevel ring gear and a backward clutch section arranged for connection to the bevel ring gear, one of the forward clutch section and the backward clutch section connectable to the bevel ring gear in response to the speed-change operation; a differential gear case connected to the clutch unit, the differential gear case operative to transmit power to a differential pinion gear and a drive shaft; and a reduction gear assembly responsive to the differential gear case via the drive shaft, the reduction gear assembly mountable to an axle assembly and operative to supply power to drive the vehicle.

According to an aspect of the present invention, a transmission for a vehicle is provided. The vehicle has an engine, and the engine operative to generate a rotation force to an output shaft via a torque converter. The transmission includes: a bevel gear section arranged to receive power from the engine at a right angle to the output shaft, the bevel gear section having a bevel pinion gear and a bevel ring gear; a clutch unit arranged to receive power from the bevel ring gear in response to a speed-change operation, the clutch unit having a forward clutch section arranged for connection to the bevel ring gear and a backward clutch section arranged for connection to the bevel ring gear, one of the forward clutch section and the backward clutch section connectable to the bevel ring gear in response to the speed-change operation; a differential gear case connected to the clutch unit, the differential gear case operative to transmit power to a differential pinion gear and a drive shaft; and a reduction gear assembly responsive to the differential gear case via the drive shaft, the reduction gear assembly mountable to an axle assembly and operative to supply power to drive the vehicle.

The reduction gear assembly may include a sun gear coupled to the drive shaft; a plurality of planetary gears meshed with the sun gear and connected to a carrier shaft; and a ring gear, fastenable to the axle assembly, meshed with the plurality of planetary gears. Power is transmitted to a wheel of the vehicle at a reduced speed via the carrier shaft.

The transmission may further include an axle assembly having wet-type brake means for braking the drive shaft and parking brake means for braking the sun gear, the wet-type brake means and the parking brake means obtaining braking force as brake discs arranged in a side-by-side relationship are squeezed against brake pads by a hydraulic pressure.

The forward clutch section, the backward clutch section, and the differential pinion gear may all be accommodated in a transmission housing, and the axle assembly may houses the wet-type brake means, the parking brake means, and a final drive housing.

Each of the forward clutch section and the backward clutch sections may include: a clutch drum having a cylinder formed therein; a piston disposed in the cylinder in such a manner that the piston can be reciprocated in the cylinder by working a fluid supplied into and discharged out of the cylinder; a spring disposed in the cylinder to bias the piston in one direction; and a clutch pack formed on an inner surface of the clutch drum. An oil connector for supplying oil may also be installed in each of forward and backward clutch sections.

The backward clutch section of the transmission may be connected to the differential gear case in such a manner that a backward coupling is meshed with an idle gear in a clutch housing, the idle gear is meshed with a counter gear, and the counter gear is meshed with a backward driving gear integrally formed with the differential gear case.

BRIEF DESCRIPTION OF THE DRAWINGS

The above and other aspects of the present invention will be more clearly understood from the following detailed description when taken in conjunction with the accompanying drawings, in which.

DETAILED DESCRIPTION

Reference will now be made in greater detail to aspects of the present invention, a preferred embodiment of the invention, a preferred embodiment/example of which is illustrated in the accompanying drawings. Wherever possible, the same reference numerals will be used throughout the drawings and the description to refer to the same or like parts.

Figure 2:
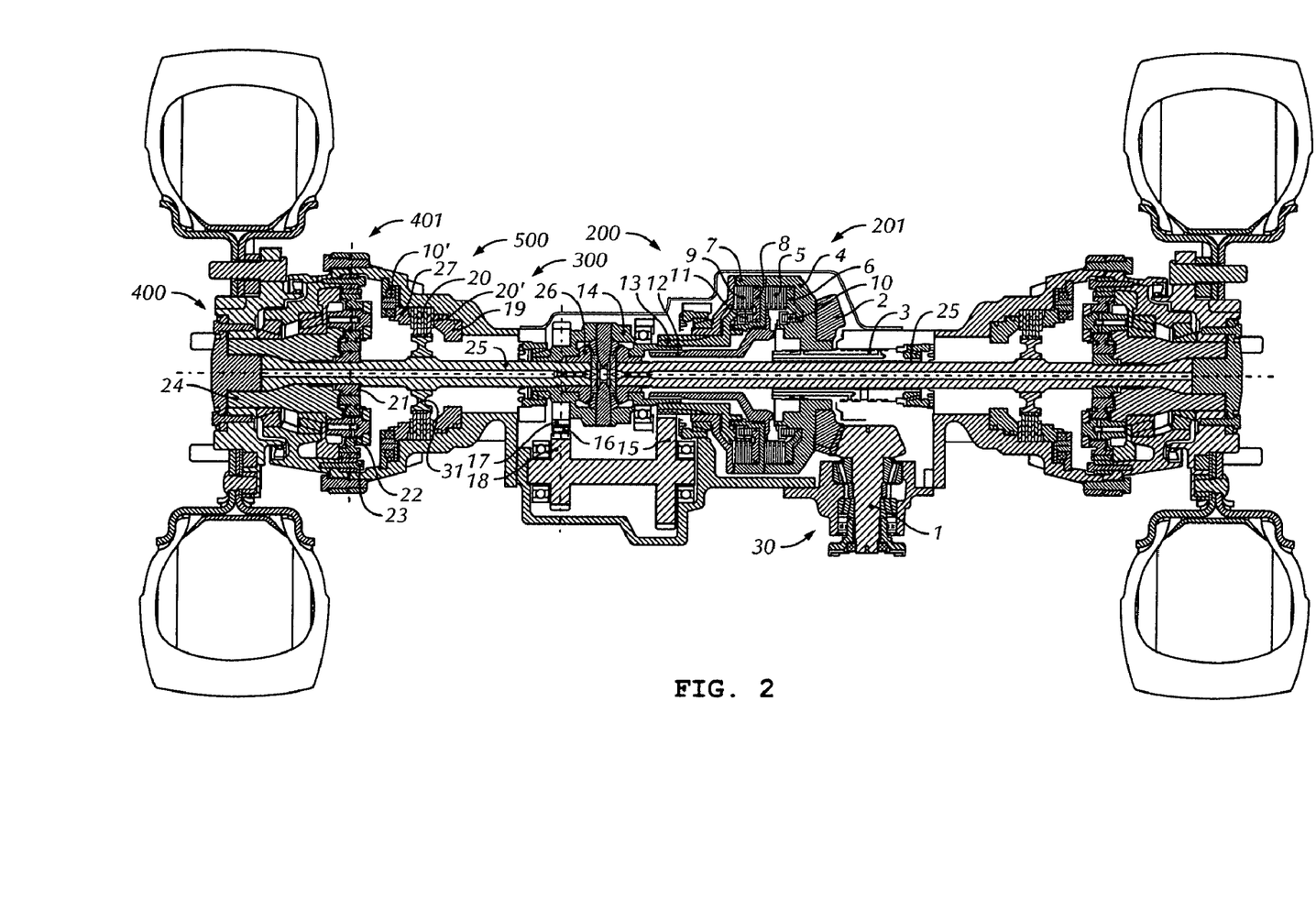
FIG. 2 is a cross-sectional view of an entire transmission in accordance with various aspects of the present invention.

FIG. 2 illustrates an entire construction and a power transmitting system of the transmission according to the present invention. As shown, the transmission receives power that is transmitted at a right angle from a bevel gear section 30. A gear shift (that is, a speed change mechanism) is implemented in a clutch unit 201. Speed-changed power is transmitted via a differential gear case 14 to a drive shaft 25, and a vehicle is driven through a reduction gear assembly 401 with speed-reduced power. Hereafter, more detailed structures of the transmission will be described with reference to FIGS. 3 through 7.

Figure 3:
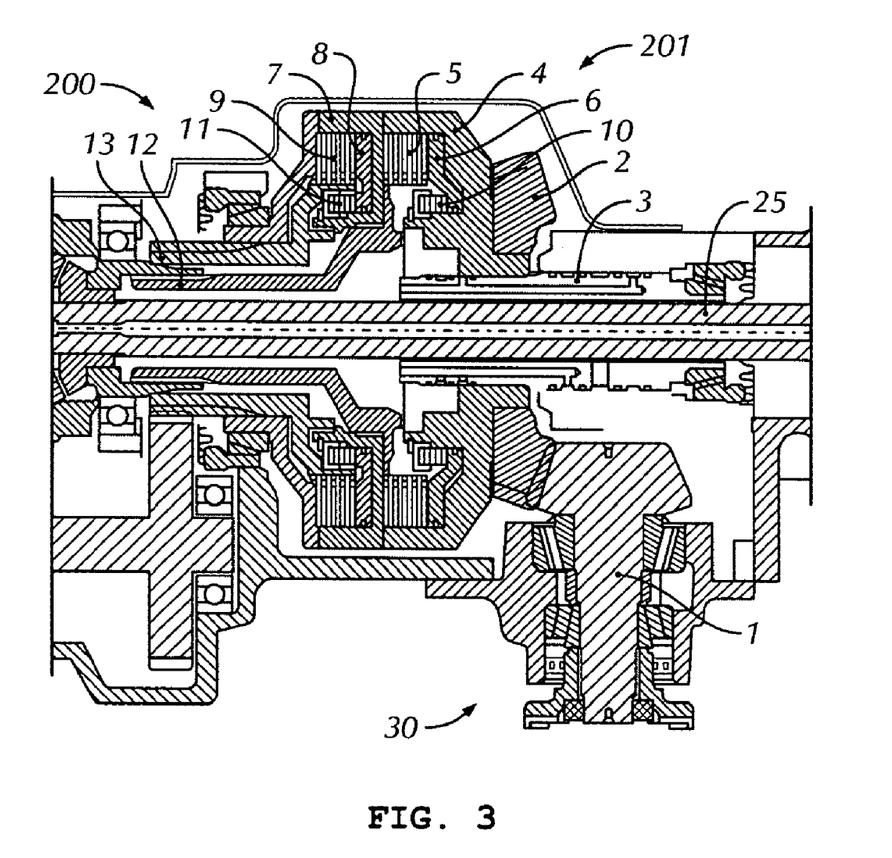
FIG. 3 is a cross-sectional view of the bevel gear section and the clutch unit in the transmission shown in FIG. 2.

FIG. 3 is a cross-sectional view illustrating the bevel gear section 30 and the clutch unit 201 in the transmission shown in FIG. 2.

Rotation force generated in an engine of the vehicle is transmitted via a torque converter to an output shaft. In the bevel gear section 30, a bevel pinion gear 1 is positioned, to which power of the output shaft is transmitted. The bevel pinion gear 1 is meshed with a bevel ring gear 2 so that power of the bevel pinion gear 1 can be transmitted at a right angle to the bevel ring gear 2.

The clutch unit 201 includes a forward clutch section and a backward clutch section. Power transmitted to the bevel ring gear 2 can be transmitted to the forward clutch section 201 which is connected to the bevel ring gear 2 when a gear shift is implemented in a forward direction or to the backward clutch section 201 which is connected to the bevel ring gear 2 when a gear shift is implemented in a backward direction.

The forward clutch section is integrally formed with the bevel ring gear 2 and a forward clutch drum 4. A cylinder is defined in the forward clutch drum 4. The forward clutch drum 4 has a hydraulic line which is connected to an oil connector 3 to define an oil path. The oil connector 3 is also connected with a backward clutch drum 7. Accordingly, as the bevel ring gear 2 is rotated, the forward and backward clutch drums 4 and 7 are rotated integrally with each other.

Meanwhile, a forward piston 6 and a backward piston 8 are disposed in the cylinders which are defined in the forward and backward clutch drums 4 and 7, respectively, so that they can be reciprocated in the cylinders by virtue of working fluid supplied into and discharged out of the cylinders. A forward return spring 10 and a backward return spring 11 are placed in the cylinders to bias the forward and backward pistons 6 and 8 toward their original positions, respectively.

In the forward clutch section, a plurality of annular plates are integrally formed on an inner surface of the forward clutch drum 4 to be positioned in a side-by-side relationship on one surface of the forward piston 6. A plurality of friction discs are integrally formed on an outer surface of an end of a forward coupling 12 in a manner such that end of the friction discs of the forward coupling 12 can be placed between two adjoining annular plates of the forward clutch drum 4. The annular plates and the friction discs constitute a forward clutch pack 5.

As in the forward clutch section, in the backward clutch section, a plurality of annular plates are integrally formed on an inner surface of the backward clutch drum 7 to be positioned in a side-by-side relationship on one surface of the backward piston 8. A plurality of friction discs are integrally formed on an outer surface of an end of a backward coupling 13 in such a manner that each of the friction discs of backward coupling 13 can be placed between two adjoining annular plates of the backward clutch drum 7. The annular plates and the friction discs constitute a backward clutch pack 9. As described above, the forward and backward pistons 6 and 8 are disposed in the cylinders such that they can be moved by a hydraulic pressure of the working fluid supplied into the cylinders.

Figure 4:
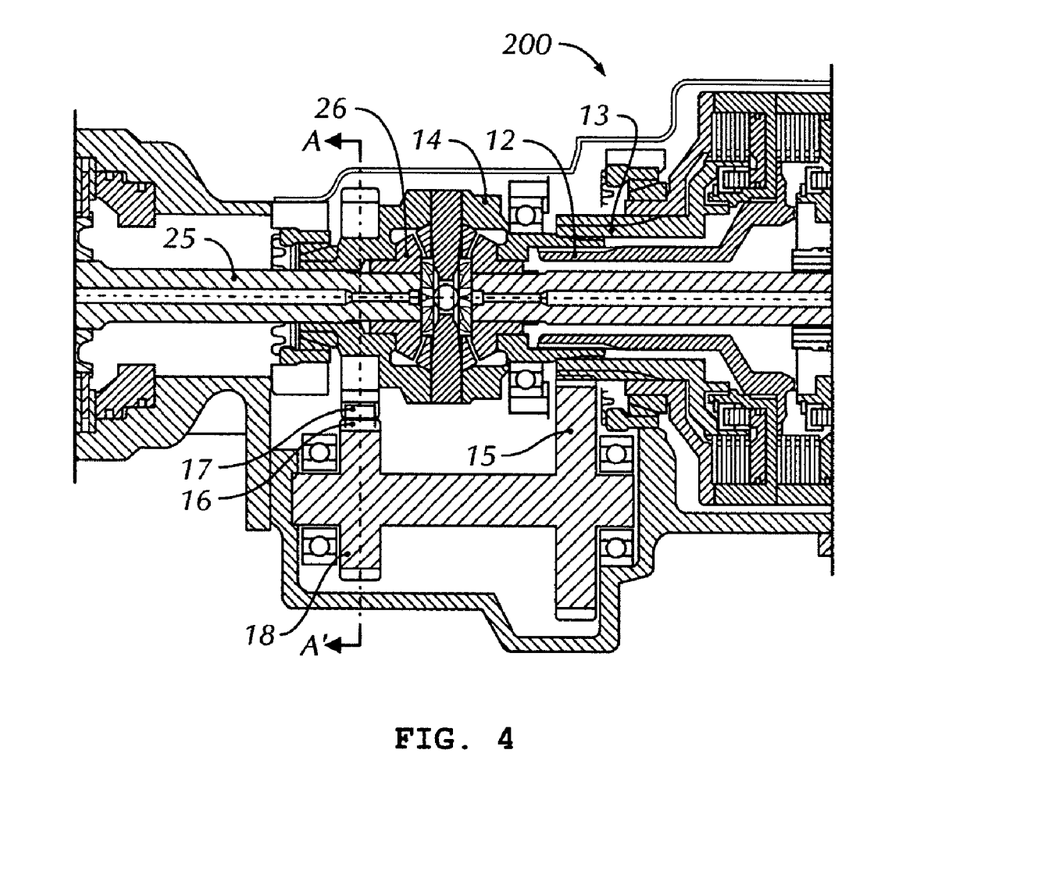
FIG. 4 is a cross-sectional view of the forward clutch section and the backward clutch section of FIG. 3, illustrating connection to a differential gear.

FIG. 4 is a cross-sectional view illustrating how the forward and backward clutch sections shown in FIG. 3 are connected to the differential gear case 14 to transmit power via a differential pinion gear 26 to the drive shaft 25 in the transmission, according aspects of the present invention.

The other end of the forward coupling 12 is splined to the differential gear case 14 to transmit power to the drive shaft 25. In the differential gear case 14, the differential pinion gear 26 is coupled to the differential gear case 14. The differential pinion gear 26 is meshed with the drive shaft 25. The drive shaft 25 transmits power to left and right wheels by way of a long shaft and a short shaft which are divided with respect to the differential pinion gear 26 depending upon a position of the clutch unit 201. That is to say, when a transmission housing 200 is formed at a left side when viewed from the position of the bevel gear section, one drive shaft which is connected to the left wheel serves as the short shaft, and the other drive shaft which is connected to the right wheel serves as the long shaft, so that the left and right wheels can be simultaneously driven.

The backward clutch section is connected to the differential gear case 14 in a manner such that forward directional power can be transmitted to the drive shaft 25 to implement a backward gear shift. To this end, the backward coupling 13 and a first idle gear 15 are meshed with each other in the transmission housing 200. A second idle gear 18 which is formed integrally with the first idle gear 15 is meshed with a counter gear 16. The counter gear 16 is meshed with a backward driving gear 17 which is formed integrally with the differential gear case 14.

Figure 5:
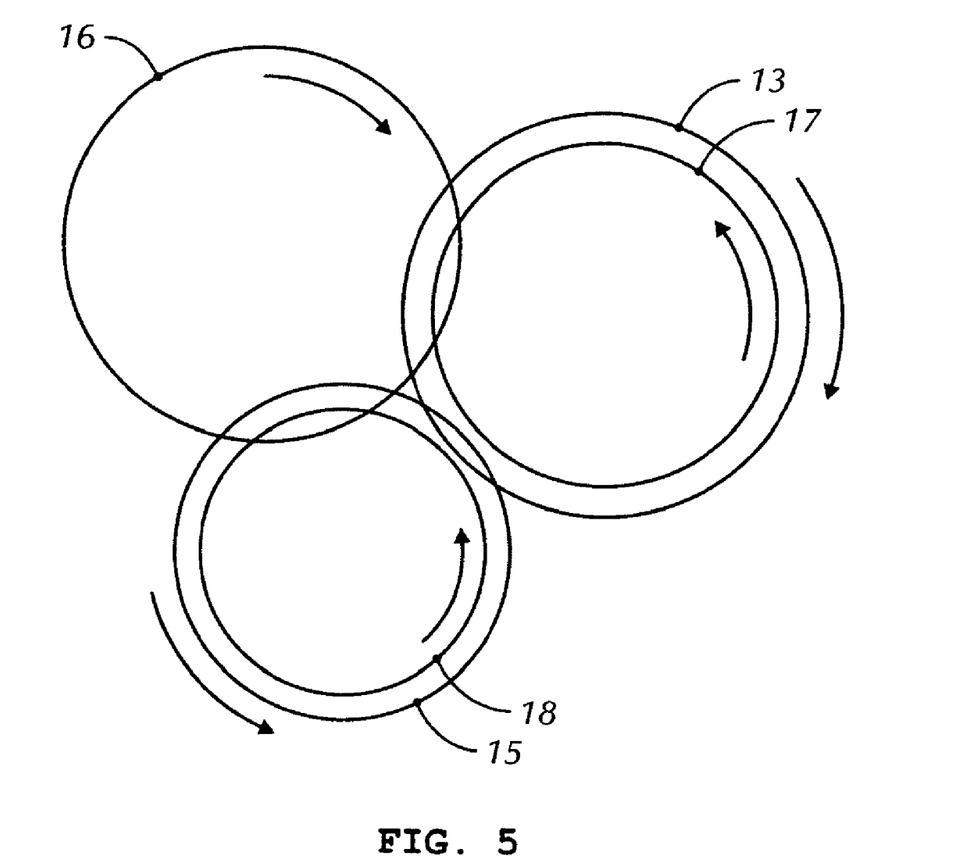
FIG. 5 is a cross-sectional view along line A-A' of FIG. 4.

FIG. 5 is a cross-sectional view along line A-A' of FIG. 4, illustrating a procedure in which the backward coupling 13 transmits power in a backward direction via the first and second idle gears 15 and 18 and the counter gear 16 to the backward driving gear 17 in the transmission, according to aspects of the present invention. As the backward coupling 13 is rotated in a clockwise direction, the first idle gear 15 meshed with the backward coupling 13 is rotated in a counterclockwise direction. The second idle gear 18 is also rotated in the counterclockwise direction, and the counter gear 16 meshed with the second idle gear 18 is rotated in the clockwise direction. Then, the backward driving gear 17 meshed with the counter gear 16 is rotated in the counterclockwise direction. Accordingly, the differential gear case 14 is rotated in a backward direction.

Figure 6:
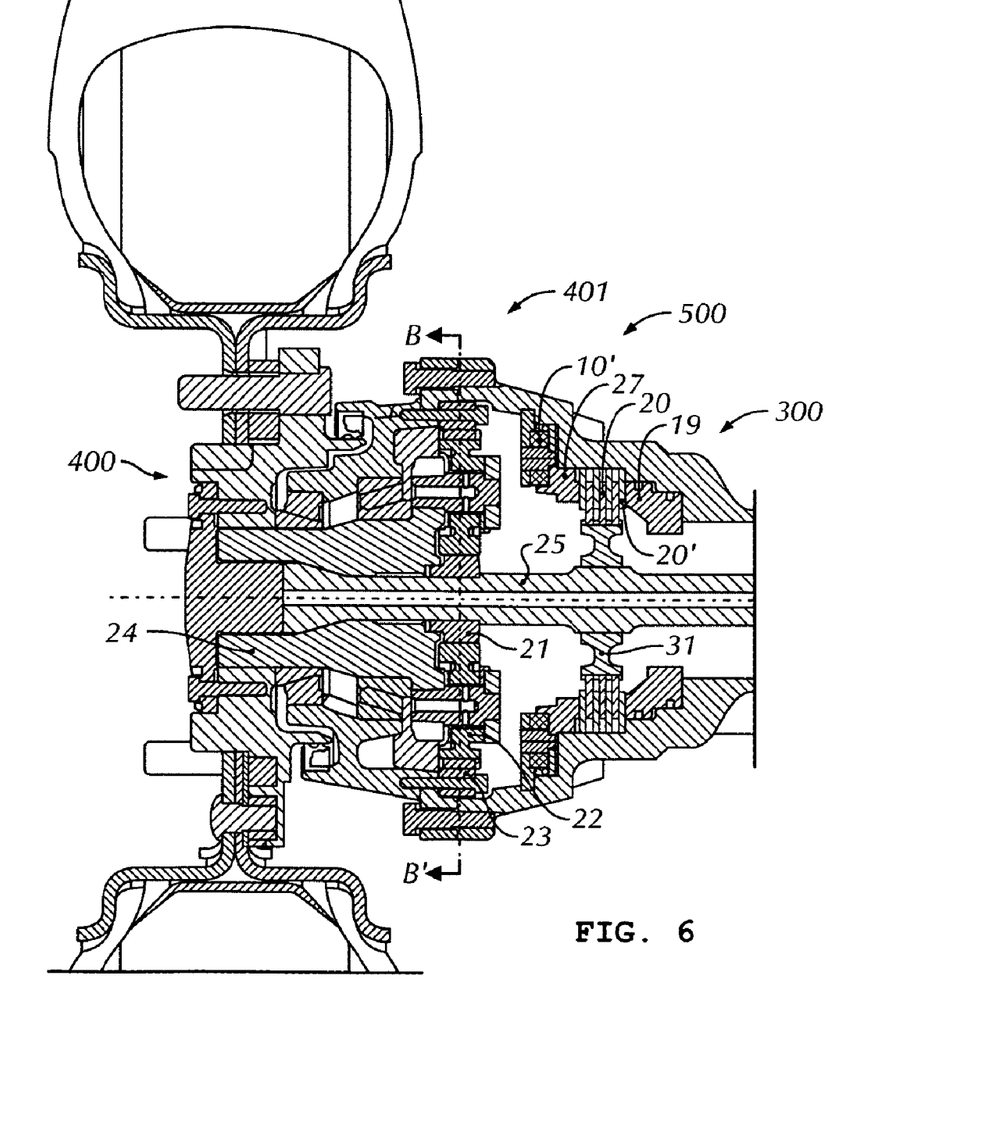
FIG. 6 is a cross-sectional view of the reduction gear assembly shown in FIG. 2.

FIG. 6 is a cross-sectional view of the reduction gear assembly 401 which is coupled to the drive shaft 25 to finally drive the vehicle. While a planetary gear assembly is illustrated as the reduction gear assembly, it is to be noted that the reduction gear assembly is not limited only to the planetary gear assembly—various modifications can be made to effect reduction without departing from the scope and spirit of the present invention.

The reduction gear assembly 401 is to drive the vehicle by reducing power of the drive shaft 25 at a reduction ratio of about 4.5:1. A sun gear 21 is coupled to the drive shaft 25. The sun gear 21 is meshed with a plurality of planetary gears 22. The plurality of planetary gears 22 are internally meshed with a ring gear 23 which is fastened to an axle assembly 500 and is connected with a carrier shaft 24 so that power can be finally transmitted through the carrier shaft 24 to the wheels in a speed-reduced state.

Figure 7:
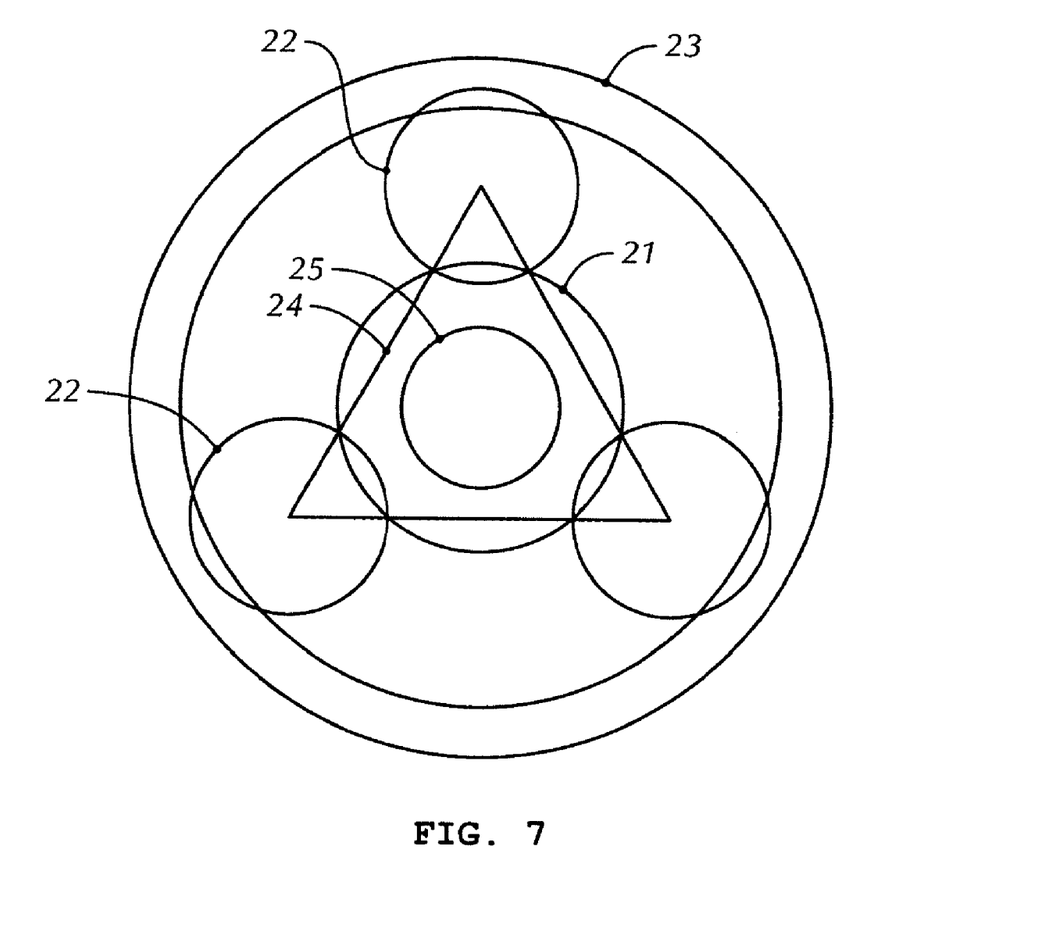
FIG. 7 is a cross-sectional view along line B-B' of FIG. 6.

FIG. 7 is a cross-sectional view along line B-B' of FIG. 6, illustrating a procedure in which a speed of the sun gear 21 integrally formed with the drive shaft 25 is reduced via the planetary gears 22 and the ring gear 23 in the transmission, according to aspects of the present invention. The plurality of planetary gears 22 are formed to have the same center as the carrier shaft 24. Thereby, as the planetary gears 22 revolve about the sun gear 21, power is transmitted to the wheels.

The axle assembly 500 which surrounds the reduction gear assembly 401 includes wet-type brake means and parking brake means. The wet-type brake means functions to brake the drive shaft 25 and comprises a brake piston 19, brake discs 20 and brake pads 20'. The parking brake means comprises a cone spring 10' and a parking brake adapter 27. In the wet-type brake means and parking brake means, the brake discs 20 and the brake pads 20', which are alternately arranged in a side-by-side relationship, are squeezed against each other by a hydraulic pressure to obtain a braking force for braking the drive shaft 25 and the sun gear 21.

In other words, the wet-type brake means is connected to the drive shaft 25 by means of a brake coupling 31, and the brake discs 20 are formed integrally on the brake coupling 31. The brake pads 20' are formed integrally with a side of the brake piston 19 of the wet-type brake means so that the brake pads 20' can be squeezed against the brake discs 20 by operation of the brake piston 19.

Also, in the parking brake means, the parking brake adapter 27 is movably positioned at one side of the brake discs 20 and the brake pads 20' which are alternately arranged in the side-by-side relationship, and the cone spring 10' is formed at the other side of the parking brake adapter 27 so that it can be compressed by a hydraulic pressure.

In the transmission according to aspects of the present invention, housings may be separately formed one from another. The forward clutch section, backward clutch section and differential pinion gear 26 are accommodated in the transmission housing 200. The axle assembly 500 comprises an axle housing 300 which includes the wet-type brake means and the parking brake means and a final drive housing 400. Due to this fact, since assembling or disassembling can be conducted for each housing, productivity can be improved and maintenance can be easily performed.

Hereafter, operation of the transmission according to aspects of the present invention, constructed as described above, will be described.

Figure 8:
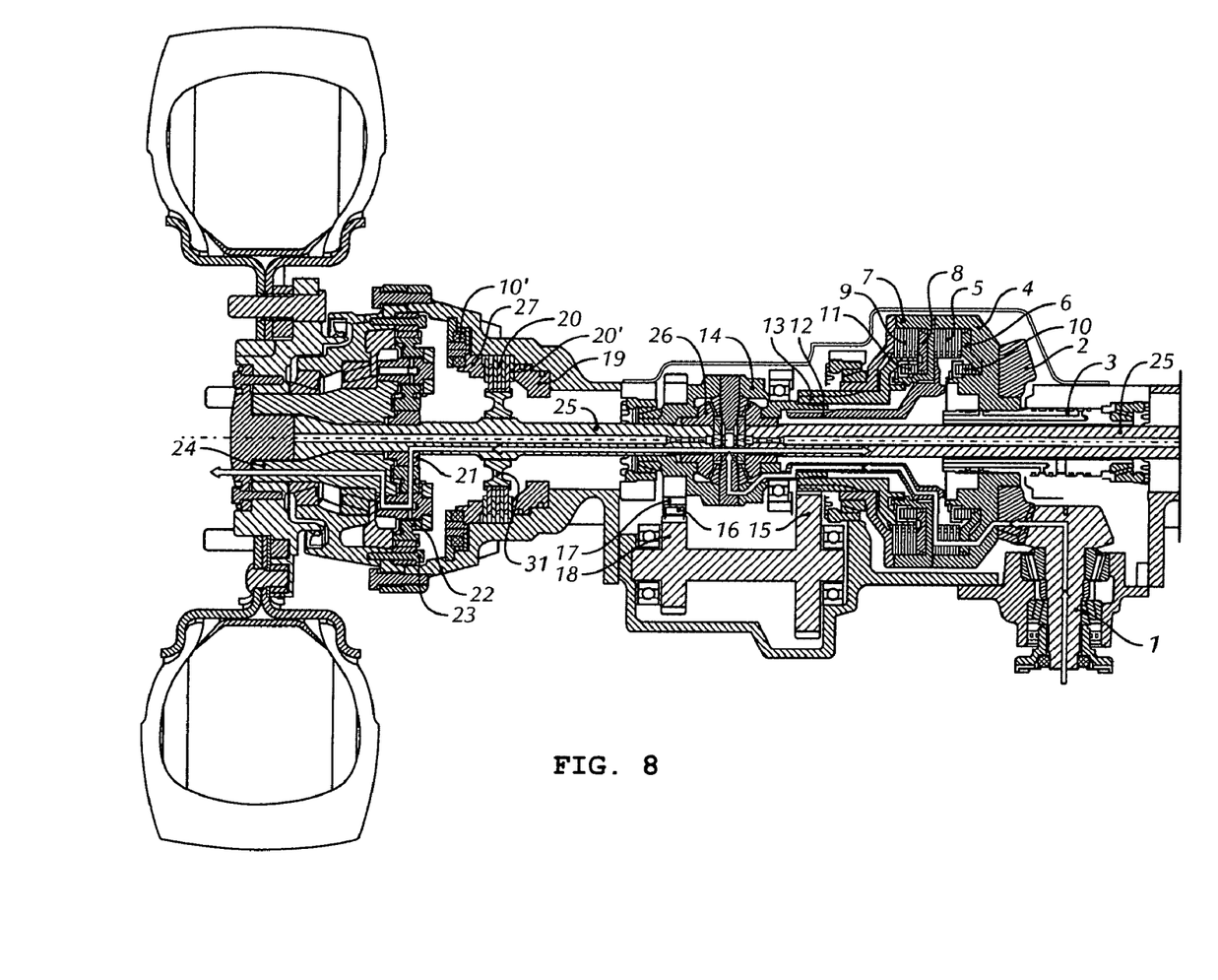
FIGS. 8 and 9 are cross-sectional views of the transmission shown in FIG. 2, illustrating courses in which power is transmitted in forward and backward directions, respectively.

FIG. 8 is a cross-sectional view illustrating a course in which power is transmitted in the forward direction as indicated by the arrows.

In the forward direction, power generated by the engine is inputted to the bevel pinion gear 1 via the torque converter. The bevel pinion gear 1 transmits power at a right angle to the bevel ring gear 2 to rotate the bevel ring gear 2. The forward clutch drum 4, which is integrally formed with the bevel ring gear 2, is rotated along with the bevel ring gear 2.

If a hydraulic pressure is applied in the forward clutch drum 4 through the oil connector 3 locked to the forward clutch drum 4 and the oil path, the piston 6 is moved in the cylinder in a direction where it squeezes the clutch pack 5. Due to the fact that the forward coupling 12 is splined to the differential gear case 14, the differential gear case 14 is rotated in the forward direction. At this time, the piston 8 of the backward clutch drum 7 does not apply a squeezing force due to the presence of the returning force of the spring 11, so that power is not transmitted between the backward coupling 13 and the backward clutch drum 7.

The differential gear case 14 rotates the differential pinion gear 26. The differential pinion gear 26, which is connected to the drive shaft 25, rotates the sun gear 21 for the left and right wheels. The sun gear 21 rotates the planetary gears 22. Because the planetary gears 22 are fixedly maintained in position, the carrier shaft 24, which is connected to the planetary gears 22, serves as an output shaft to drive the vehicle in the forward direction.

Figure 9:
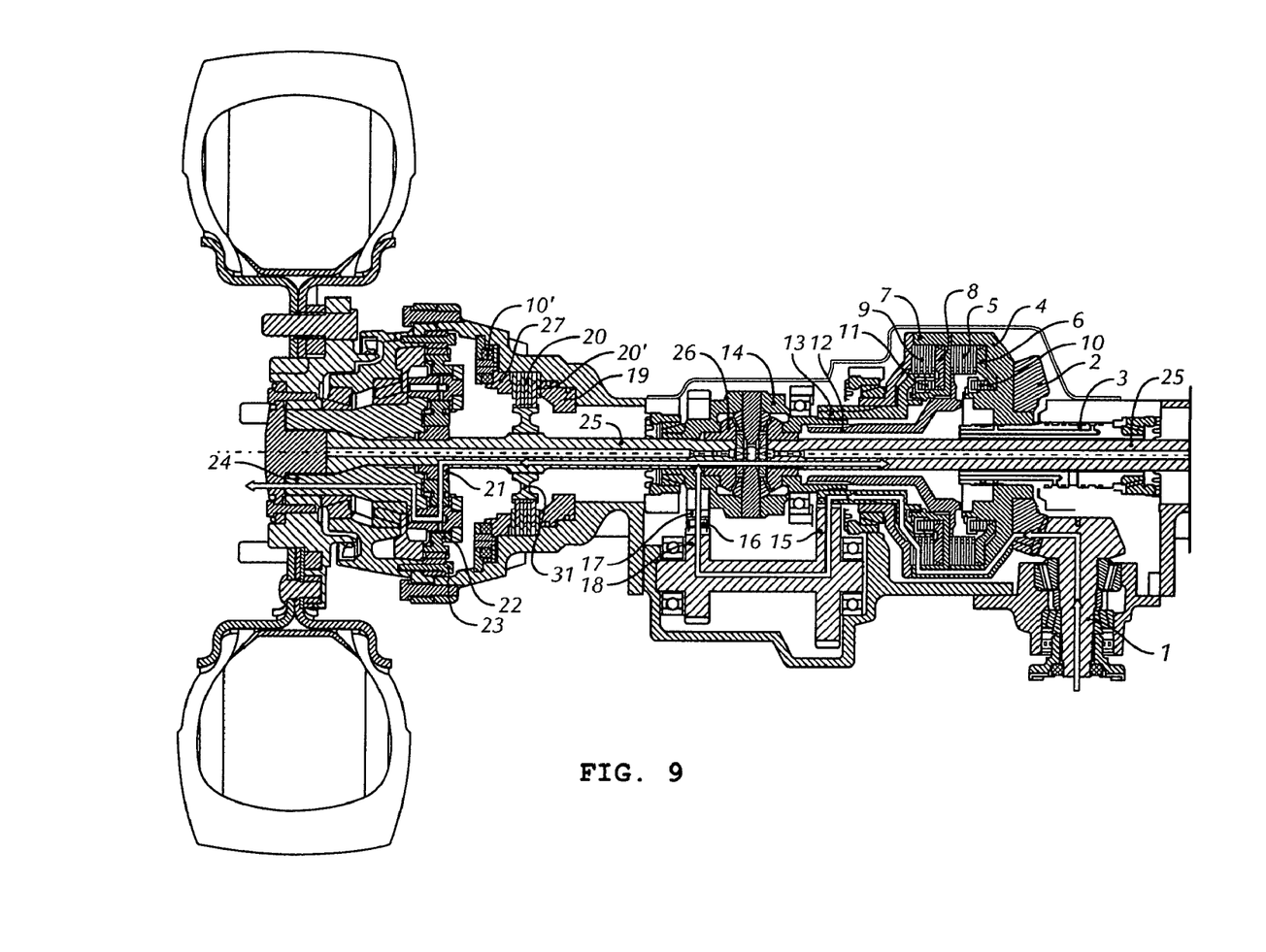

FIG. 9 is a cross-sectional view illustrating a course in which power is transmitted in the backward direction as indicated by the arrows.

In the backward direction, power generated by the engine is inputted to the bevel pinion gear 1 via the torque converter. The bevel pinion gear 1 transmits power at a right angle to the bevel ring gear 2 to rotate the bevel ring gear 2. The backward clutch drum 7 and the oil connector 3 are connected to the bevel ring gear 2 by means of the forward clutch drum 4 to be rotated integrally with the bevel ring gear 2.

If a hydraulic pressure is applied in the backward clutch drum 7, the backward piston 8 is moved in the cylinder in a direction where it squeezes the clutch pack 9. Due to the fact that the backward coupling 13 is meshed with one end of the first idle gear 15, the first idle gear 15 is rotated in the backward direction. At this time, the piston 6 of the forward clutch drum 4 does not apply a squeezing force due to the presence of the returning force of the spring 10, and the forward coupling 12 is held uncoupled from the differential pinion gear 26.

The second idle gear 18, which is formed at the other end of the first idle gear 15, rotates the counter gear 16 in the forward direction. The counter gear 16 rotates in the backward direction the differential gear case 14, which is integrally formed with the backward driving gear 17.

Accordingly, the sun gear 21 for left and right wheels is rotated in the backward direction in a speed-reduced state. The sun gear 21 rotates the planetary gears 22. Because the planetary gears 22 are fixedly maintained in position, the carrier shaft 24, which is connected to the planetary gears 22, serves as an output shaft to drive the vehicle in the backward direction.

Operation of the wet-type brake means and the parking brake means of the axle assembly 500, which surrounds the reduction gear assembly 401, is described below.

Brake discs 20 and the brake pads 20' are squeezed against each other by a hydraulic pressure and thereby the drive shaft 25 and the sun gear 21 are braked.

In one situation, if a start key is turned on to drive a car, as the parking brake adapter 27 compresses the cone spring 10' with the aid of a hydraulic pressure of fluid flowing through the axle assembly 500, the brake discs 20 and the brake pads 20', which are alternately arranged in the side-by-side relationship, are released from the squeezed state to allow the brake coupling 31 to be freely rotated, whereby the drive shaft 25 and the sun gear 21 can be freely rotated.

In another situation, if the start key is turned off to park the car, as a returning force of the cone spring 10' acts on the parking brake adapter 27, which is not applied with a hydraulic pressure, the brake discs 20 and the brake pads 20' are squeezed against each other, and the drive shaft 25 and the sun gear 21 are braked by means of the brake coupling 31.

The transmission according to aspects of the present invention thus provides numerous advantages: since a reduction gear assembly and a clutch unit, which are integrally constructed in the conventional art, are separately constructed from each other, noise and vibration are minimized; it is possible to reduce noise generated when a bevel gear is rotated because a transmission clutch unit is positioned between the bevel gear and a differential pinion gear, it is possible to sufficiently secure an installation space and design mounting of an engine and an axle with a wide range of freedom; because the transmission is constructed to allow a speed change to be implemented after the bevel gear with an rpm reduced, shock generated when implementing a speed change is decreased, and on-board comfortableness and durability of the vehicle are improved; because a transmission housing, an axle housing and a final drive housing are separately constructed, only an axle assembly need be disassembled to overhaul the transmission—the need for disassembling the entire vehicle is obviated and it is possible to flexibly satisfy mounting conditions of various vehicles; because of the separation of the clutch unit and the reduction gear assembly, the transmission is simplified and its weight reduced, and the number of parts is decreased and its manufacturing cost is reduced; and instead of using a drum brake as is used in the conventional art, since wet-type brake means and parking brake means are mounted to the axle housing in accordance with aspects of the present invention, it is possible to design a compact vehicle, and to ensure a semi-permanent use of the brake means and secure stability when parking the vehicle.

Although a preferred embodiment of the present invention has been described for illustrative purposes, it will be appreciated that various modifications, additions and substitutions are possible, without departing from the scope and spirit of the invention as disclosed in the accompanying claims.

What is claimed is:

1. A transmission for a vehicle, the vehicle having an engine, the engine operative to generate a rotation force to an output shaft via a torque converter, the transmission comprising:
    a bevel gear section arranged to receive power from the engine at a right angle to the output shaft, the bevel gear section having a bevel pinion gear and a bevel ring gear;
    a clutch unit arranged to receive power from the bevel ring gear in response to a speed-change operation, the clutch unit having a forward clutch section arranged for connection to the bevel ring gear and a backward clutch section arranged for connection to the bevel ring gear, one of the forward clutch section and the backward clutch section connectable to the bevel ring gear in response to the speed-change operation;
    a differential gear case connected to the clutch unit, the differential gear case operative to transmit power to a differential pinion gear and a drive shaft, and
    a reduction gear assembly responsive to the differential gear case via the drive shaft, the reduction gear assembly mountable to an axle assembly and operative to supply power to drive the vehicle,
    wherein, the bevel ring gear, the clutch unit and the differential gear case are provided coaxially.

2. The transmission as set forth in claim 1, wherein the reduction gear assembly comprises:
    a sun gear is coupled to the drive shaft;
    a plurality of planetary gears meshed with the sun gear and connected to a carrier shaft; and
    a ring gear, fastenable to the axle assembly, meshed with the plurality of planetary gears,
    power transmittable to a wheel of the vehicle at a reduced speed via the carrier shaft.

3. The transmission as set forth in claim 2, further comprising:
    an axle assembly having wet-type brake means for braking the drive shaft and parking brake means for braking the sun gear, the wet-type brake means and the parking brake means obtaining braking force as brake discs arranged in a side-by-side relationship are squeezed against brake pads by a hydraulic pressure.

4. The transmission as set forth in claim 1, wherein each of the forward clutch section and the backward clutch section comprises:
    a clutch drum having a cylinder formed therein;
    a piston disposed in the cylinder in such a manner that the piston can be reciprocated in the cylinder by working a fluid supplied into and discharged out of the cylinder;
    a spring disposed in the cylinder to bias the piston in one direction; and
    a clutch pack formed on an inner surface of the clutch drum.

5. The transmission as set forth in claim 1, wherein the backward clutch section is connected to the differential gear case in such a manner that a backward coupling is meshed with an idle gear in a clutch housing, the idle gear is meshed with a counter gear, and the counter gear is meshed with a backward driving gear integrally formed with the differential gear case.

6. The transmission as set forth in claim 3, wherein the forward clutch section, the backward clutch section, and the differential pinion gear are accommodated in a transmission housing, and wherein the axle assembly houses the wet-type brake means, the parking brake means, and a final drive housing.

7. The transmission as set forth in claim 1, wherein an oil connector for supplying oil is installed in each of forward and backward clutch sections.

8. The transmission as set forth in claim 5, wherein the bevel pinion gear and the bevel ring gear rotate in only one direction.

* * * * *